United States Patent
Douglas et al.

(10) Patent No.: US 10,691,179 B2
(45) Date of Patent: Jun. 23, 2020

(54) CAMERA ASSEMBLY FOR ELECTRONIC DEVICES

(71) Applicant: Lenovo (Singapore) Pte. Ltd., New Tech Park (SG)

(72) Inventors: David W. Douglas, Cary, NC (US); Ritchie Alan Russ, Raleigh, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 26 days.

(21) Appl. No.: 15/706,917

(22) Filed: Sep. 18, 2017

(65) Prior Publication Data
US 2018/0004256 A1  Jan. 4, 2018

Related U.S. Application Data

(62) Division of application No. 14/926,437, filed on Oct. 29, 2015, now abandoned.

(51) Int. Cl.
*H04N 5/225* (2006.01)
*G06F 1/16* (2006.01)
*G06F 3/02* (2006.01)

(52) U.S. Cl.
CPC .......... *G06F 1/1686* (2013.01); *G06F 1/1616* (2013.01); *G06F 3/021* (2013.01); *H04N 5/2252* (2013.01); *H04N 5/2254* (2013.01)

(58) Field of Classification Search
CPC ............ H01H 13/70; H01H 2223/042; H04N 2005/4416; H03K 17/9618; H03K 17/98; G07B 2017/00274; G06F 1/1666; G06F 3/02; G06F 3/021; G10H 2220/265
See application file for complete search history.

(56) References Cited

U.S. PATENT DOCUMENTS

| | | | | |
|---|---|---|---|---|
| 6,812,958 B1* | 11/2004 | Silvester | ............... | G06F 1/1607 348/207.1 |
| 7,327,560 B1 | 2/2008 | Tabasso et al. | | |
| 8,644,012 B2 | 2/2014 | Lee | | |
| 8,811,003 B1* | 8/2014 | Hayashida | ............ | G06F 1/1662 361/679.08 |
| 2003/0197685 A1* | 10/2003 | Yi | ........................... | G06F 3/021 345/168 |
| 2005/0083645 A1* | 4/2005 | Moore | .................. | G06F 1/1616 361/679.11 |
| 2007/0063977 A1* | 3/2007 | Kuo | ........................ | G06F 3/021 345/168 |

(Continued)

OTHER PUBLICATIONS

Title: "Activation Force and Travel Effects on Overexertion in Repetitive Key Tapping" Author: Robert G. Radwin Date: 1997 (Year: 1997).*

*Primary Examiner* — Twyler L Haskins
*Assistant Examiner* — Wesley J Chiu
(74) *Attorney, Agent, or Firm* — The Small Patent Law Group LLC; Dean D. Small

(57) ABSTRACT

An electronic device is provided that comprises a housing, a processor and memory provided within the housing, a keyboard on the housing and a display. A camera assembly includes a camera and a camera support member having first and second ends. The camera is provided on the camera support member proximate the first end. The second end movably connected to the housing such that the camera support member may be moved from a closed state to an open state.

22 Claims, 11 Drawing Sheets

(56) References Cited

U.S. PATENT DOCUMENTS

| | | | |
|---|---|---|---|
| 2007/0070207 A1 | 3/2007 | Sakurai | |
| 2008/0117581 A1 | 5/2008 | Kuo | |
| 2009/0166493 A1* | 7/2009 | Lee | G06F 1/1616 |
| | | | 248/226.11 |
| 2010/0097245 A1* | 4/2010 | Wang | G06F 3/021 |
| | | | 341/22 |
| 2011/0075016 A1 | 3/2011 | Shimizu | |
| 2011/0291935 A1* | 12/2011 | Liu | G06F 3/021 |
| | | | 345/168 |
| 2012/0169888 A1 | 7/2012 | Clark | |
| 2013/0106983 A1 | 5/2013 | Fritsch et al. | |
| 2014/0160655 A1 | 6/2014 | Yebka et al. | |
| 2014/0267029 A1* | 9/2014 | Govil | G06K 9/00355 |
| | | | 345/157 |
| 2015/0049023 A1* | 2/2015 | Wu | G06F 3/023 |
| | | | 345/168 |
| 2015/0092331 A1 | 4/2015 | Kinoshita et al. | |
| 2015/0281525 A1 | 10/2015 | Thakur | |

* cited by examiner

CAMERA ASSEMBLY FOR ELECTRONIC DEVICES

CROSS-REFERENCE TO RELATED APPLICATIONS

This application is a divisional application of, and claims benefit to the filing date of, U.S. patent application Ser. No. 14/926,437, filed Oct. 29, 2015, titled, "CAMERA ASSEMBLY FOR ELECTRONIC DEVICES," the subject matter of which is herein incorporated by reference in its entirety.

BACKGROUND

Embodiments of the present disclosure generally relate to electronic devices that include camera assemblies.

In recent years, various types of electronic devices have been developed, such as personal computers, tablet devices, smart phones and the like. Modern electronic devices offer a variety of features, some of which utilize a camera that is built into the housing of the electronic device. A basic use of cameras, that are integrated into electronic devices, relate to the capture of still and video images of the user and surrounding environment, such as during a bidirectional audiovisual communication session (e.g. a FaceTime session, a videoconferencing session and the like). For example, conventional laptop computers position the integrated camera within a bezel surrounding the display. The camera is generally centered above the display in order to capture the user's image while watching the display or otherwise interacting through the laptop computer during an audiovisual communications session.

However, as technology advances, the form factor of electronic devices continues to be reduced. As the size of electronic devices is reduced, the real estate available for holding a camera becomes more challenging. For example, in laptop computers, as the computer's dimensions are reduced, the space within the bezel surrounding the display similarly is reduced. The reductions in real estate are not limited to the XY direction across the width and height of the device housing (or display part). In addition, technology and manufacturing processes continue to evolve that allow electronic devices to be made thinner and thinner (as measured in the easy direction when closed). Accordingly, the "Z-height" (or thickness) of the computer continues to reduce which reduces the depth within the display part of the housing.

To further complicate the foregoing challenges, an ongoing demand exists to provide more enhanced features in electronic devices. Some enhanced features relate to enhanced camera functionality. By way of example, a demand exists for cameras that support infrared (IR) functions such as in connection with the gaze detection, eye tracking, facial detection, iris authentication and the like. Cameras that offer enhanced features, such as IR functions or otherwise, have a corresponding larger form factor, as compared to cameras with fewer features. The feature rich cameras utilize lenses and other components that result in a bigger or thicker camera module, as compared to cameras with minimal features. Consequently, a difficulty exist in positioning feature rich cameras within electronic devices having smaller and smaller overall form factors.

A need remains for small form factor electronic devices having feature-rich cameras integrated therein and methods of utilizing such electronic devices.

SUMMARY

In accordance with an embodiment, an electronic device is provided that comprises a housing, a processor and memory provided within the housing, a keyboard on the housing and a display. A camera assembly includes a camera and a camera support member having first and second ends. The camera is provided on the camera support member proximate the first end. The second end movably connected to the housing such that the camera support member may be moved from a closed state to an open state.

Optionally, the camera support member includes inner and outer arms connected to one another in a telescoping manner such that the inner arm contracts into the outer arm when in the closed state and the inner arm at least partially extends from the outer arm when in the open state. The outer arm includes an interior elongated cavity extending along a length of the outer arm. The cavity including a retention element engaging the inner arm and maintaining the inner and outer arms at one or more predetermined positions relative to one another when extended. The camera support member includes a hinge element provided at the second end. The hinge element rotatably is coupled to the camera support member to the upper face of the housing.

Optionally, the upper face of the housing includes a recessed pocket shaped and dimensioned to receive the camera support member and camera when in the closed state. The camera is pivotally connected at the first end to the camera support member such that the camera rotates about a longitudinal axis of the camera support member when in the open state. The camera includes a lens optically coupled to a digital camera circuit, the lens provided at an outer end of the camera support member, the digital camera circuit held within the camera support member. Optionally, the camera support member includes a communications interface mounted thereon. The communications interface detachably coupling to a corresponding communications port on the electronic device such that the camera support member is physically and electrically attachable and detachable from the electronic device.

The keyboard includes multiple keys and the camera assembly is at least partially housed within one of the keys. The camera assembly including a lens that is provided in a face of the corresponding key, the corresponding key rocking between opened and closed states to expose and cover the lens. The keyboard includes a barrel assembly located along at least a portion of a row of keys on the keyboard. The barrel assembly includes the camera assembled. The barrel assembly including at least one key thereon that is exposed when the barrel assembly is rotated to a first position. The camera assembly is positioned in the open state when the barrel assembly is rotated to a second position.

In accordance with an embodiment, a method is provided for an electronic device with an adjustable camera assembly. The electronic device provides a housing, a processor and memory provided within the housing, a keyboard on the housing and a display. The method comprises providing a camera assembly including a camera and a camera support member having first and second ends. The camera provided on the camera support member proximate to the first end. The second end movably connected to the housing such that the camera support member may be moved from a closed state to an open state.

Optionally, the camera support member includes inner and outer arms. The method further comprises activating the camera assembly by extending at least partially the inner and outer arms relative to one another in a telescoping manner to the open state. The method further comprises maintaining the inner and outer arms at one or more predetermined positions relative to one another when extended. The method further comprises rotatably coupling the camera support member to an upper face of the housing and positioning the camera assembly within a recessed pocket in an upper face of the housing when in the closed state.

Optionally, the method further comprises pivotally connecting the camera to the first end to the camera support member such that the camera rotates about a longitudinal axis of the camera support member when in the open state. The method comprises processing video data captured by the camera assembly to at least partially remove a spidering effect. The keyboard includes multiple keys and the camera assembly is housed within one of the keys. The method further comprising rotating the corresponding key between opened and closed states.

DETAILED DESCRIPTION

Figure 1:
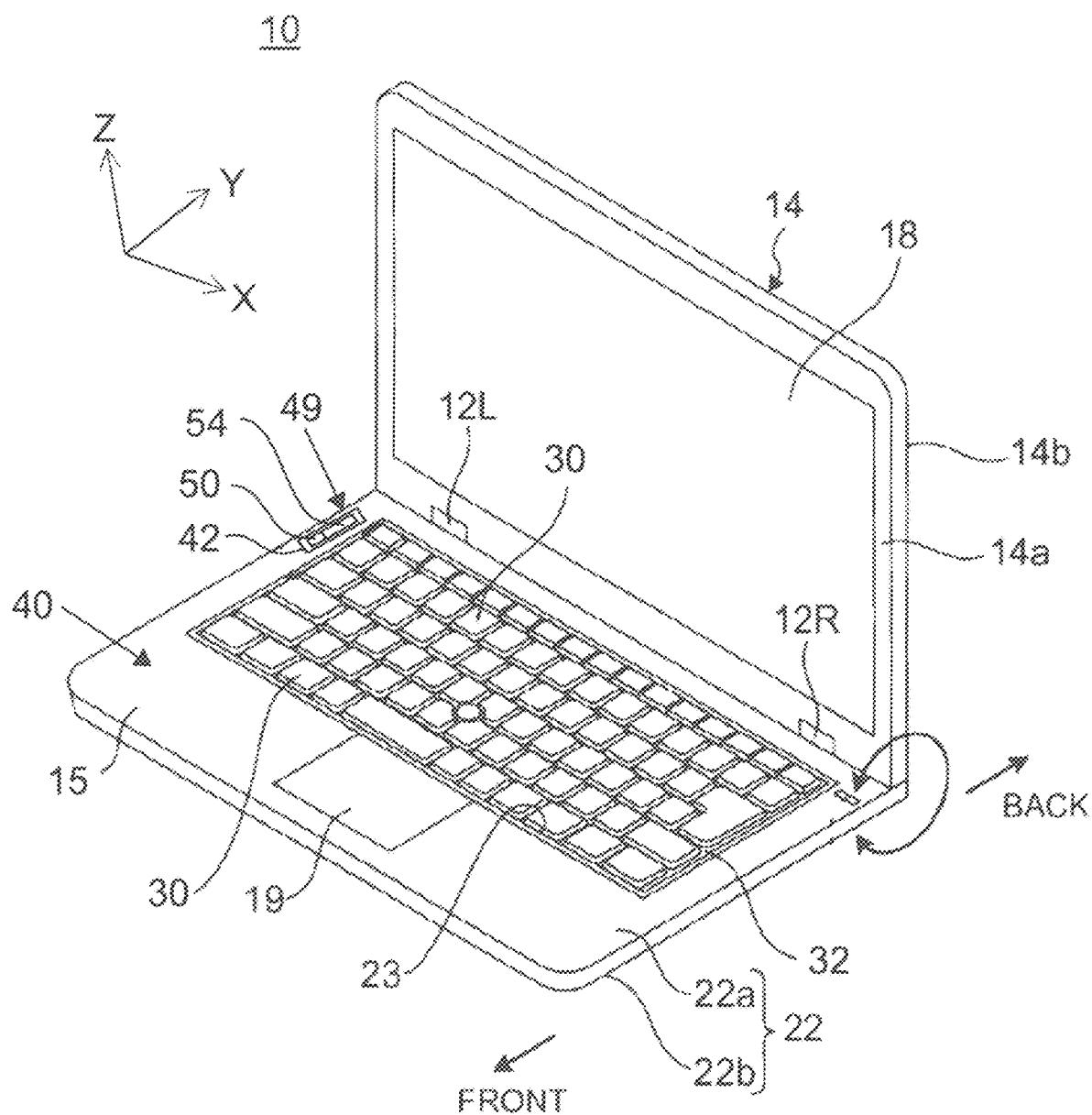
FIG. 1 illustrates an overview of an electronic device formed in accordance with embodiments herein.

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

In accordance with embodiments herein, an electronic device is provided with a camera assembly that is movably mounted to the housing of a main body part of the electronic device. The camera assembly is constructed to rotate or otherwise move from a closed state position to an upright open state position. The camera assembly is also configured to extend to one or more select heights relative to the upper face of the device housing. In certain environments, it may be desirable to position the camera assembly with the camera at a height corresponding to the middle of the display screen in order to provide eye to eye contact during communications. By locating the camera generally even with the middle of the display screen, less perspective distortion is provided. For example, the camera avoids providing the impression of looking downward onto the forehead of the user or upward at the chin and nose of the user. Optionally, the camera may be rotated 360° (or 180° in either direction). The camera may be rotated to face away from the user or to face the user. For example, it may be desirable to have the camera face away from the user such as when in a conference room environment in order to direct the camera at other individuals in the conference room. The camera assembly is collapsible and closed into the housing of the electronic device to provide added security. The camera assembly is automatically turned off when in the closed state in order to save power.

Figure 2:
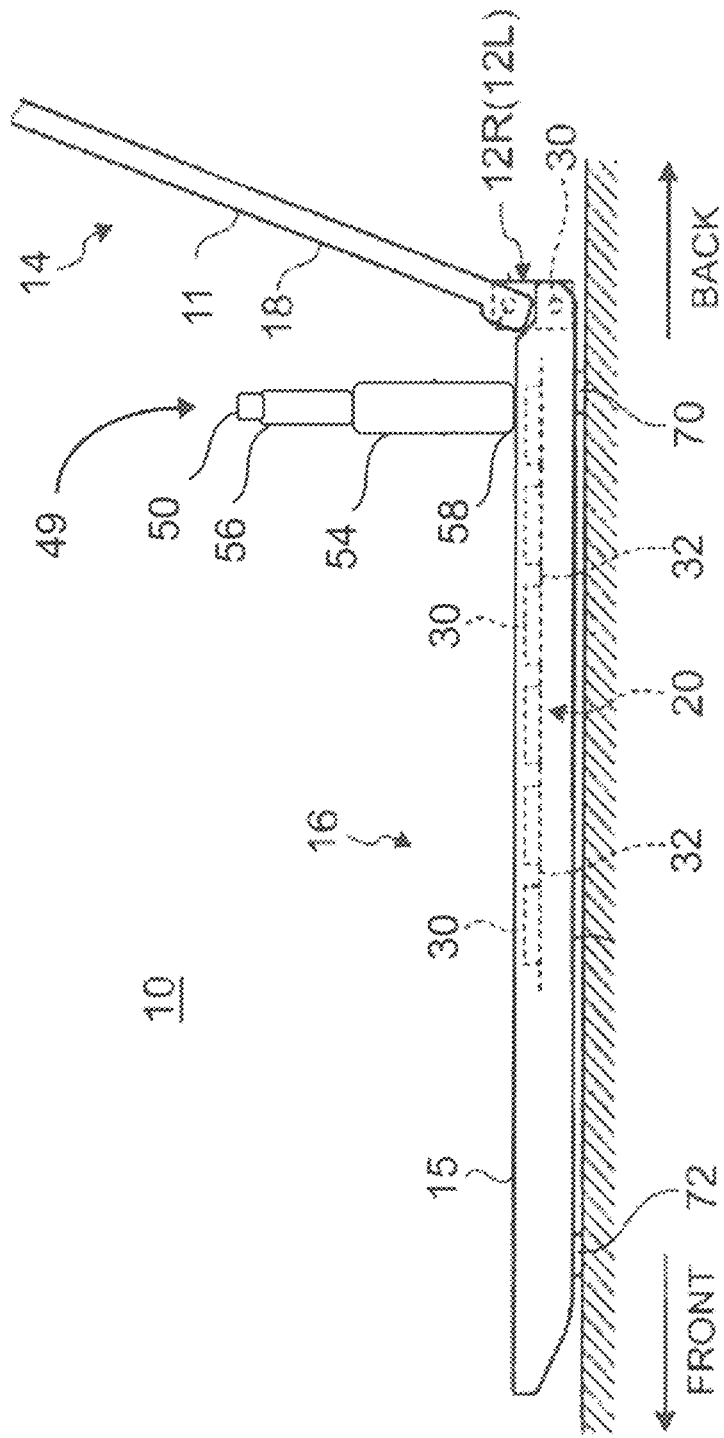
FIG. 2 illustrates the camera assembly when in an open state in accordance with embodiments herein.

FIG. 1 is a perspective view of an electronic device 10 according to one embodiment. The electronic device 10 includes a housing 40 that holds various mechanical and electrical components depending upon the nature of the electronic device 10. The housing 40 includes a display part 14 and a main body part 16. FIG. 1 shows a state where the display part 14 is opened from the main body part 16 via a hinge mechanism 12L and 12R until they become oriented at a select angle relative to one another. FIG. 2 is a side view illustrating one example of the usage form as a laptop PC of the electronic device 10 shown in FIG. 1.

The electronic device 10 according to an embodiment is a convertible tablet personal computer (convertible PC), which can be used preferably as a laptop PC in the state where the display part 14 is rotated to an angular position relative to the main body part 16 (see FIG. 1 and FIG. 2), and can be used preferably as a tablet PC in the state where the display part 14 is rotated to the 360-degree position relative to the main body part 16 (not shown). An embodiment is applicable not only to such a convertible PC but also to any electronic devices including a display part that is rotatable to the 360-degree position relative to a main body part, such as a mobile phone, a smartphone, or an electronic notebook.

The following description is based on the usage form as a laptop illustrated in FIGS. 1 and 2, and viewed from a user who manipulates a keyboard 20 and a click pad 19 disposed at an upper face 15 of the main body part 16 while viewing a display 18 disposed at a front face 11 of the display part 14, a front side is referred to as a front side (forward) and a back side is referred to as a back side (backward), the thickness direction of the main body part 16 is referred to as a vertical direction, and the width direction is referred to as a horizontal direction.

As illustrated in FIG. 1, the electronic device 10 includes the display part 14 having the display 18 and the main body part 16 having the keyboard 20. The display part 14 and the main body part 16 are joined rotatably from the 0-degree position to the 360-degree position via a pair of the left and right hinge mechanisms 12L and 12R (hereinafter called "hinge mechanism 12" collectively).

The display part 14 is electrically connected to the main body part 16 via a not-illustrated cable passing through the hinge mechanism 12. The display 18 includes a touch-screen type liquid crystal display, for example. The main body part 16 includes a main body chassis 22 having a flat-box shape, at a back-end edge of which the hinge mechanism 12 is disposed, and the main body chassis 22 stores various electronic components that are not illustrated therein, such as a board, an arithmetic unit and a memory. The keyboard 20 disposed at the upper face 15 of the main body part 16 includes a plurality of keys 30 and a bezel 32 provided at the periphery of the keys 30. The bezel 32 is a frame body made up of one plate member having a plurality of holes (not shown) for insertion of the keys 30 there through. The bezel 32 can move vertically in an opening of the upper face 15 of the main body part 16, specifically in an opening 23 at an upper cover 22a of the main body chassis 22 to dispose the keyboard 20, and such vertical operation (advancing/retracting operation) and the rotation operation of the display part 14 via the hinge mechanism 12 are performed in a ganged manner.

The device 10 also includes a camera assembly 49 that includes a camera 50 provided on a camera support member 54. FIG. 2 better illustrates the camera assembly 49 when in an open state. The camera support member 54 includes first and second ends 56 and 58 (also referred to as an outer end 56 and a base and 58). The camera 50 is mounted to the first/outer end 56. The camera 50 may be mounted in a fixed or pivotal relation relative to the camera support member 54. The second base end 58 is movably connected to the housing 40 such that the camera support member 54 may be moved from a closed state (FIG. 1) to an open state (FIG. 2). The housing 40 includes a recessed pocket 42 formed into the upper face 15. The recessed pocket 42 is shaped and dimensioned to receive the camera support member 54 and camera 50 when in the closed state. By way of example, the recessed pocket 42 may be sufficiently deep in the Z direction that, when in the closed state, an outer surface of the camera support member 54 rests below or is flush with the upper face 15 of the housing 40.

Figure 3A:
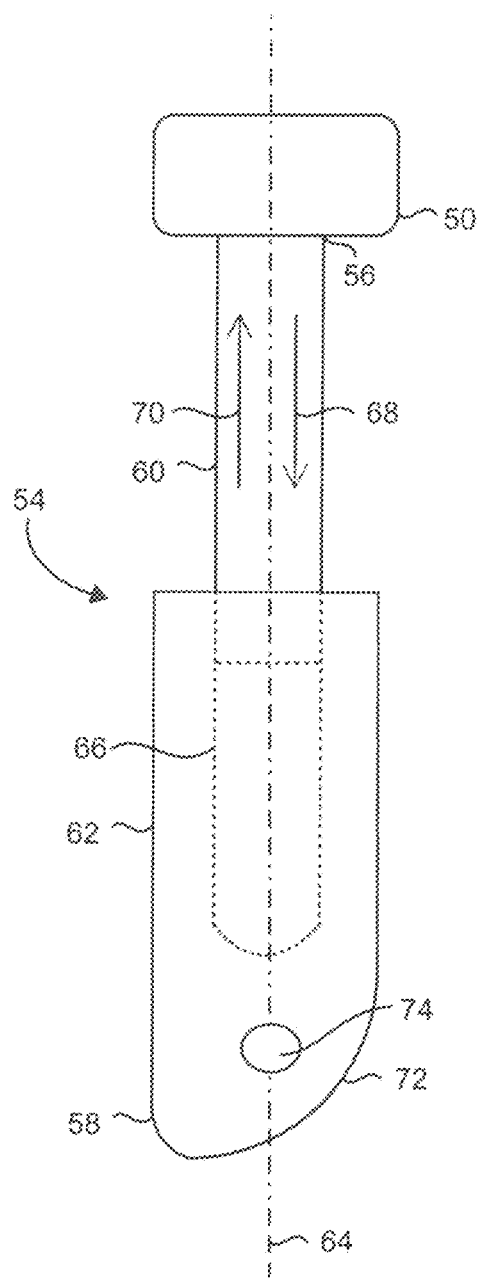
FIG. 3A illustrates an example of a camera support member formed in accordance with embodiments herein.
Figure 3B:
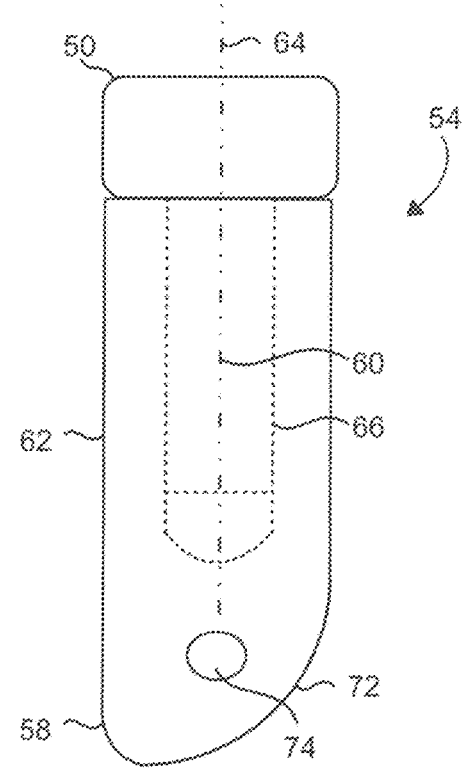
FIG. 3B illustrates an example of a camera support member formed in accordance with embodiments herein.

FIGS. 3A and 3B illustrate an example of a camera support member 54 formed in accordance with embodiments herein. FIG. 3A illustrates the camera support member 54 when in an extended state, while FIG. 3B illustrates the camera support member 54 while in a contracted state. The camera support member 54 includes inner and outer arms 60 and 62 that are connected to one another in a telescoping manner. The inner and outer arms 60 and 62 are elongated and oriented to extend along a common longitudinal axis 64. The outer arm 62 includes an interior cavity 66 that is shaped and dimensioned to receive the inner arm 60. The inner arm 60 moves in the direction of arrows 68 and 70 when contracting and extending. The outer end 56 of the inner arm 60 is securely or pivotally mounted to the camera 50. The base end 58 of the outer arms 62 is configured to be pivotally (or otherwise) mounted to the housing 40 of the electronic device 10. While not shown, wires extend through the inner and outer arms 60, 62 to connect the camera 50 to the electronic components within the electronic device 10.

As shown in FIG. 3A, the inner arm 60 telescopes out of the outer arms 62 when in the extended state (which corresponds to the open state as illustrated in FIG. 2). As shown in FIG. 3B, the inner arm 60 telescopes/contracts into the outer arm 62 when in the collapsed state (which corresponds to the closed state as illustrated in FIG. 1). In the example of FIGS. 3A and 3B, the camera 50 is illustrated to have a cross-sectional shape/size (e.g. outer diameter) that substantially corresponds to a cross-sectional shape/size (e.g. outer diameter) of the outer arm 62 such that, when in the collapsed/closed state, an outer envelope of the camera 50 generally conforms to the outer envelope of the outer arm 62.

Optionally, the camera 50 may be constructed in alternative manners such that the form factor of the camera 50 differs from the illustrated shapes. For example, the camera 50 may be constructed to have an outer form factor that generally conforms to or is smaller than the outer diameter of the inner arm 60. For example, the camera 50 may be constructed to have an outer diameter that is similar to the outer diameter of the inner arm 60 such that, when in the contracted/closed state, the camera 50 may fit into the cavity 66 of the outer arm 62.

In the example of FIGS. 3A and 3B, the base end 58 of the camera support member 54 is constructed with a hinge element 74 (e.g., a pin or bracket). A beveled surface 72 avoids interference with the housing 40 when the camera support member 54 is rotated about the hinge element 74 between opened and closed positions/state.

Figure 3C:
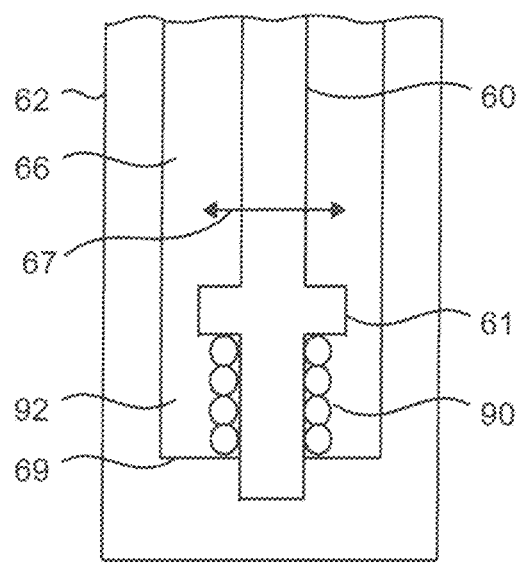
FIG. 3C illustrates a side sectional view of a retention section of the camera support member in accordance with an embodiment herein.
Figure 3D:
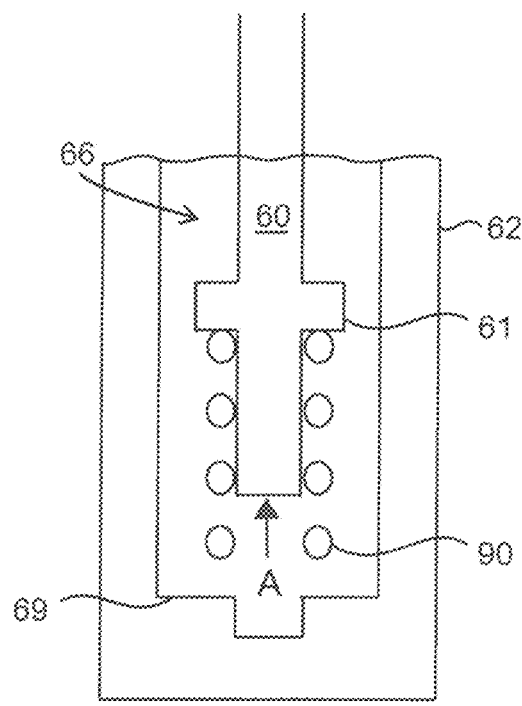
FIG. 3D illustrates a side sectional view of a retention section of the camera support member in accordance with an embodiment herein.

FIGS. 3C and 3D illustrate a side sectional view of a retention section of the camera support member 54 in accordance with an embodiment herein. FIGS. 3C and 3D illustration the interior cavity 66 in more detail within the outer arm 62. The interior cavity 66 is elongated and extends along a length of the outer arm 62. The cavity 66 includes a retention element 90 that engages the inner arm 60 and maintains the inner and outer arms 60, 62 at one or more predetermined positions relative to one another when extended at least partially.

By way of example, the cavity 66 may have a lateral width 67 that is greater than the diameter of the inner arm 62 to provide a peripheral area 92 that receives a retention element 90. The inner arm 60 may also include a flange 61 extending about a circumference of the inner arm 60 and located at an intermediate point along the length of the inner arm 60. The retention element 90 is held between the flange 61 and a base 69 of the cavity 66.

As one example, the retention element 90 may represent a spring that is wound about an exterior surface of the inner arm 60. When the inner arm 60 is contracted (as shown in FIG. 3C), the retention element 90 (spring) is compressed between the base 69 and flange 61. When the inner arm 60 is extended (as shown in FIG. 3D), the retention element 90 expands. In one embodiment, the retention element 90 may apply an outward force against the flange 61 in order to cause the inner arm 60 to "pop" out from the outer arm 62. Optionally, the retention element 90 may be constructed from other structures, other than a spring. The retention element 90 applies sufficient force (e.g., in the direction of arrow A or as a frictional force) to maintain the inner arm 60 in a select position when in the open state. Accordingly, the retention element 90 may actively force the inner arm 60 to extend (such as when a spring is used). Optionally, the retention element 90 may simply hold the inner arm 60 at any position to which a user manually adjusts the camera 50.

As one example, the retention element 90 may simply represent a coating or other layer to from a frictional interface between an exterior surface of the inner arm 60 and the surface of the cavity 66. The frictional interface of the retention element 90 may be created by various coatings or other layers applied to the adjoining surfaces of the inner arm 60 and cavity 66. The amount of friction may be predetermined to maintain the inner arm 60 at any extended position relative to the outer arm 62 as set by the user. For example, when the user opens the camera support member 54, the user may pull up on the outer end 56 and camera 50 until the inner arm 60 extends a desired distance from the outer arm 62. The inner arm 60 may be extended a very small amount or fully extended (e.g. 10 to 100% extended). The frictional interface between the inner arm 60 and cavity 66 maintains the amount of extension as set by the user.

Optionally, the retention element 90 may represent a threaded interface wherein the exterior surface of the inner arm 60 and interior surface of the cavity 66 include mating threads. When a threaded interface is used as the retention element 90, the inner arm 60 may be extended and contracted by "unscrewing" and "screwing in" the inner arm 60 relative to the outer arm 62.

Figure 4A:
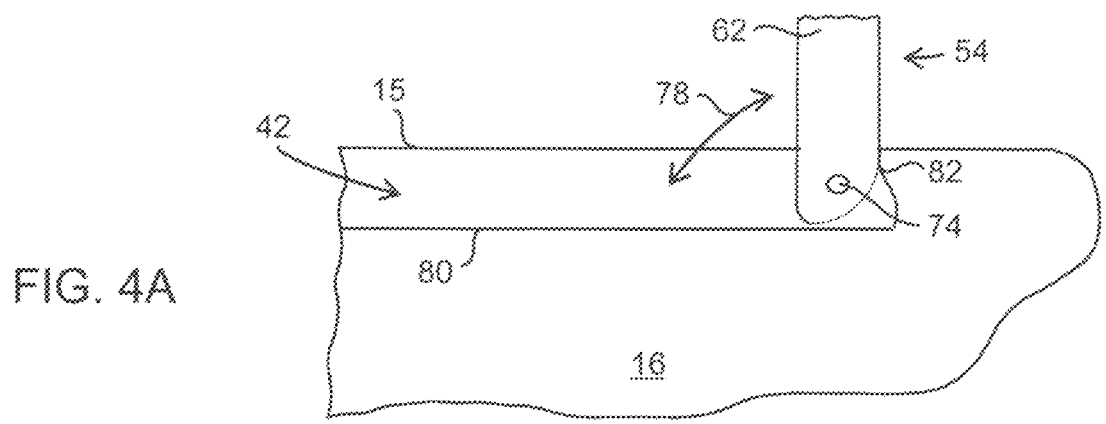
FIG. 4A illustrates enlarged views of a portion of the main body part of the housing, as well as, the recessed pocket and a lower portion of the camera support member when in an open state in accordance with embodiments herein.
Figure 4B:
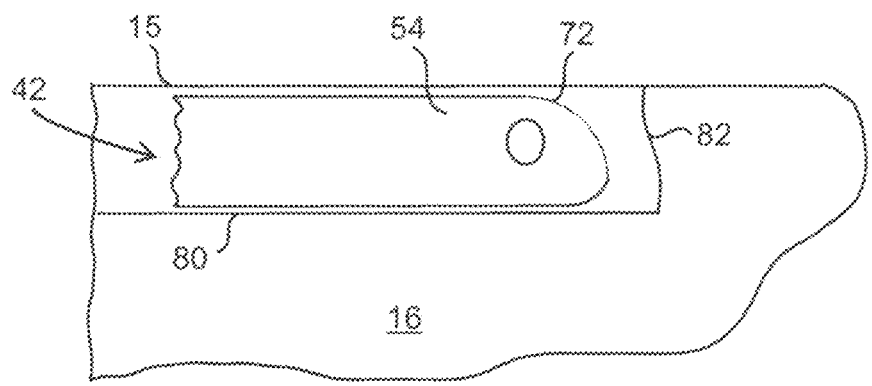
FIG. 4B illustrates enlarged views of a portion of the main body part of the housing, as well as, the recessed pocket and a lower portion of the camera support member when in a closed state in accordance with embodiments herein.

FIGS. 4A and 4B illustrate enlarged views of a portion of the main body part 16 of the housing 40, as well as, the recessed pocket 42 and a lower portion of the camera support member 54 when in an open state (FIG. 4A) and when a closed state (FIG. 4B). As a point of reference, the upper face 15 of the main body part 16 is illustrated. As shown in FIG. 4B, an outer surface of the camera support member 54 is below of flush with the upper face 15 of the main body part 16 when in the closed state. The camera support member 54 pivots at a hinge element 74, along an arcuate path as denoted by arrow 78 when moved between the open and close states.

The recessed pocket 42 includes a floor 80 that is spaced a depth below the upper face 15 based upon a width or thickness of the camera support member 54. Optionally, the pocket 42 may include a rear wall 82 that is positioned relative to the hinge element 74 such that, when in the open state, the outer arm 62 abuts against the rear wall 82 to provide support and to define an outer limit for a range of arcuate motion over which the camera support member 54 is permitted to rotate. For example, the rear wall 82 may be positioned relative to the hinge element 74 to define an angular limit between the camera support member 54 and the upper face 15 when in the fully open state. As illustrated in FIGS. 4A and 4B, the beveled surface 72 rotates past the rear wall 82 to avoid interference there between when transitioning between the open and closed states.

Figure 5:
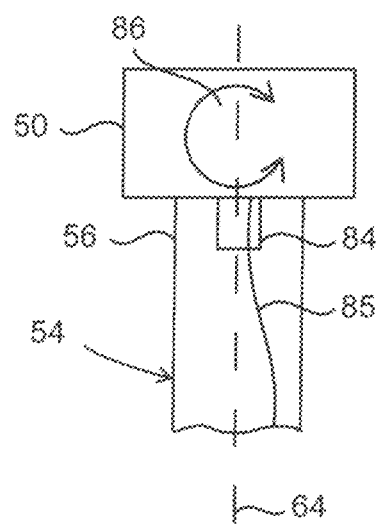
FIG. 5 illustrates a side view of an outer portion of the camera support member and camera in accordance with an embodiment herein.

FIG. 5 illustrates a side view of an outer portion of the camera support member 54 and camera 50 in accordance with an embodiment herein. In the example of FIG. 5, the camera 50 is pivotally mounted by a post 84 to the outer end 56 of the camera support member 54. The post 84 permits the camera 50 to rotate about the longitudinal axis 64, such as in the direction illustrated by arrow 86. By way of example, it may be desirable to pivotally connect the camera 50 enable the camera 50 to be rotated during use to capture different scenes and to adjust the field of view. Optionally, the camera 50 may be fixedly mounted to the outer end 56 such that no pivotal rotation or other type of movement is permitted relative to the camera support member 54.

The camera 50 may freely rotate 360° with restriction, or rotate up to a rotational limit in opposite directions (e.g., 90°-180° in opposite directions). A wire 85 may extend from the camera 50 to the electronics in the electronic device 10 to support communication there between. Optionally, the camera 50 may communicate with one or more processors in the electronic device 10 through a wireless connection (e.g., Bluetooth, WiFi, etc.).

Figure 6:
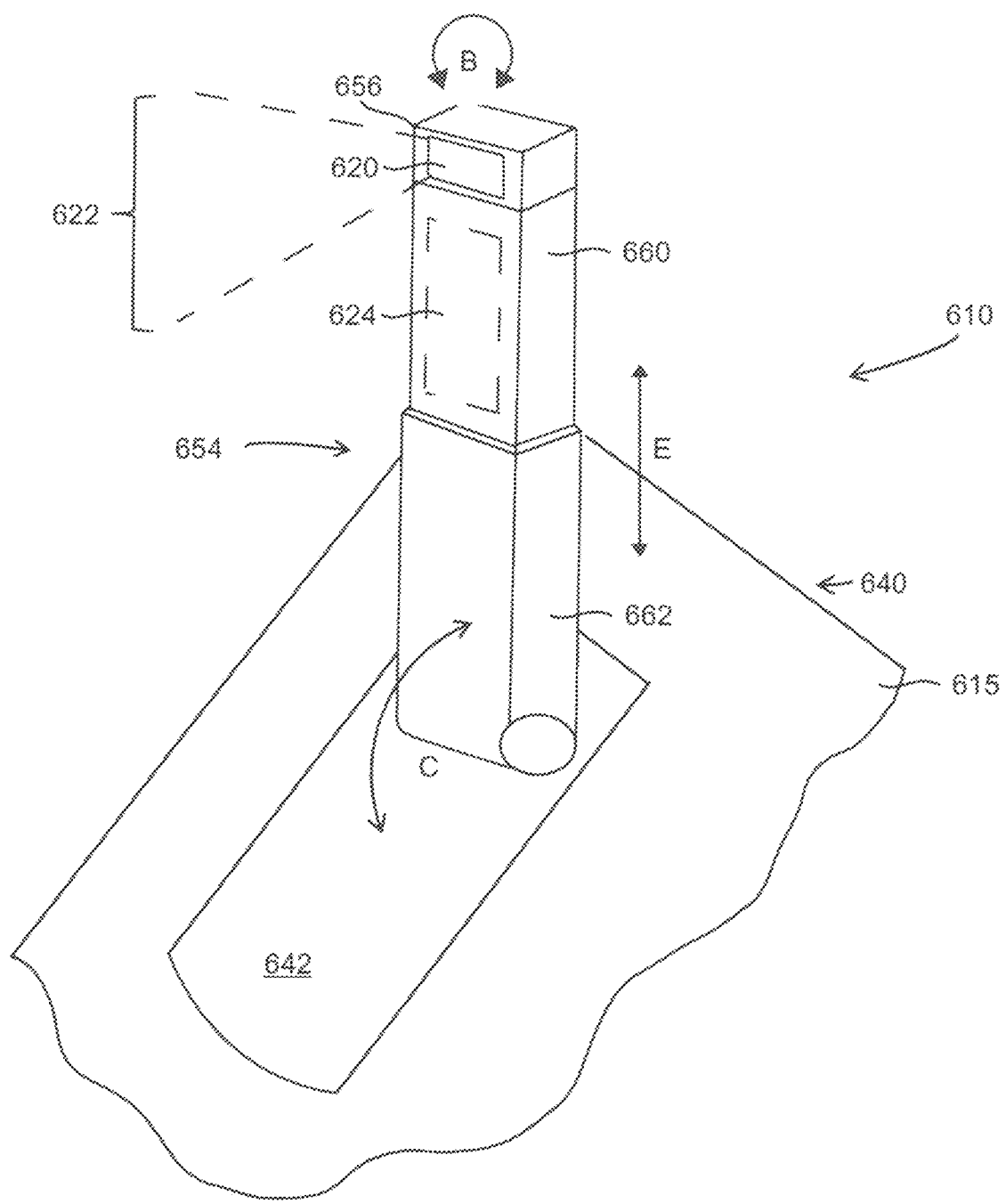
FIG. 6 illustrates a perspective view of a camera assembly formed in accordance with embodiments herein.

FIG. 6 illustrates a perspective view of a camera assembly 610 formed in accordance with embodiments herein. The camera assembly 610 is mounted to an upper face 615 of the housing 640 of an electronic device. The upper face 615 includes a recessed pocket 642 that is elongated and shaped to receive the camera assembly 610 when in a closed state. The camera assembly 610 includes an inner arm 660 and an outer arm 662 that telescope relative to one another. In the example of FIG. 6, the inner and outer arms 660 and 662 have rectangular cross-sections. Optionally, various shapes may be utilized for the arms 660 and 662. An outer end 656 of the arm 660 includes a lens 620 that has a corresponding field of view 622. The lens 620 is optically coupled to a digital camera circuit 624 which is housed within the camera support member 654, such as within the inner arm 660. As one non-limiting example, the circuit 624 may represent a charge coupled device (CCD) having an optical input with an array of pixels aligned with the lens 620. The lens 620 focuses images from the field of view 622 onto the CCD within the circuit 624 which measures the color, brightness and other information in connection with each pixel within the CCD. The circuit 624 provides still and video images/frames of the field of view 622. It is recognized that various types of cameras, lenses and circuits may be utilized in accordance with embodiments herein.

As noted above, the lens 620 may be swiveled, such as denoted by arrow B, to adjust the field of view 622. In addition, the camera support member 654 may be tilted/pivoted in an arcuate manner as denoted by arrow C about a pivot point at the base of the outer arm 662. A height of the lens 620 relative to the upper face 615 of the housing may be adjusted upward and downward in the direction of arrow E by telescoping the inner arm 660.

Figure 7B:
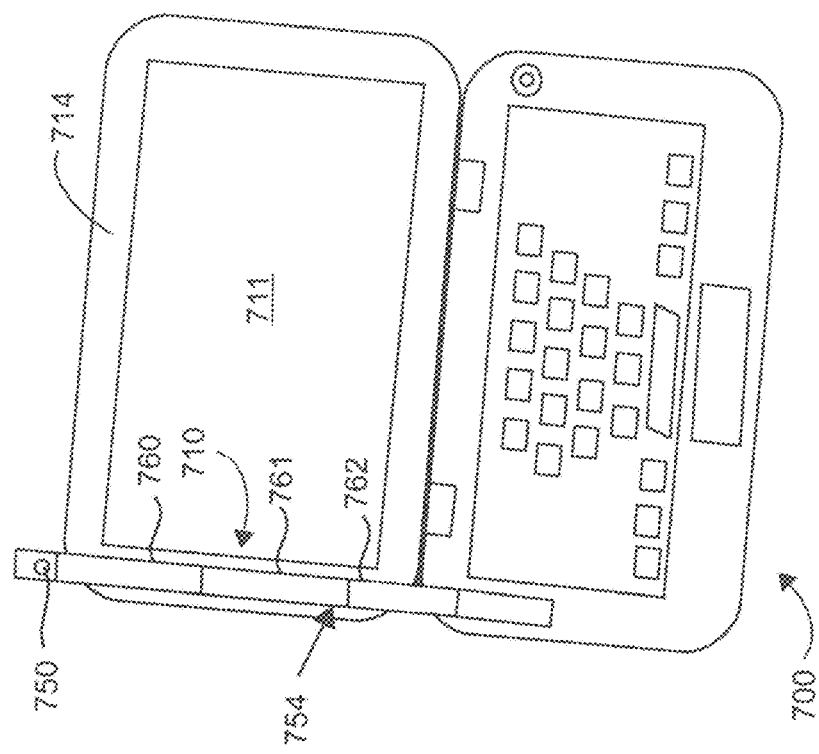
FIG. 7B illustrates a front perspective view of the electronic device with the camera assembly extended to a full telescope length in accordance with an embodiment herein.
Figure 7A:
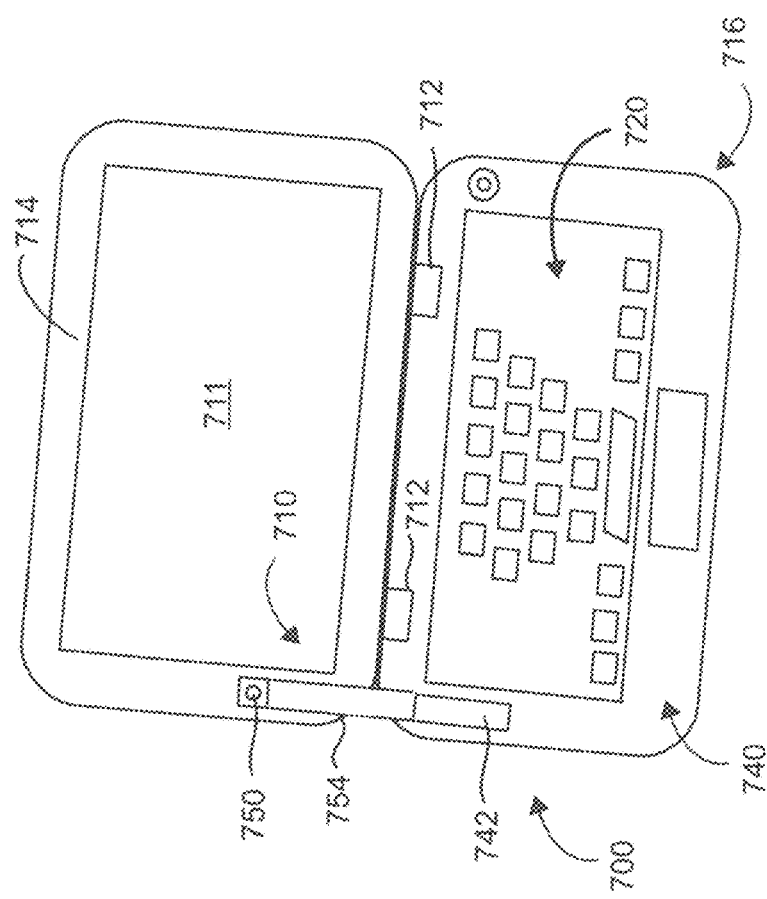
FIG. 7A illustrates a front perspective view of an electronic device formed in accordance with an embodiment herein.

FIG. 7A illustrates a front perspective view of an electronic device 700 formed in accordance with an embodiment herein. The electronic device 700 of FIG. 7A represents a portable computer having a housing 740. A camera assembly 710 is mounted along one side of the keyboard 720 proximate to an edge of the housing 740 where hinges 712 couple a display part 714 to a main body part 716. Optionally, the camera assembly 710 may be located in other areas upon the main body part 716, as well as along the sides, top bottom of the display part 714. For example, the camera assembly 710 may be located on the left or right sides of the keyboard 720. As another example, the camera assembly 710 may be mounted in the region of the housing 740 above the keyboard 720 between the hinges 712, and proximate to the function keys of the keyboard 720. In FIG. 7A, the camera assembly 710 has been rotated to an upright position and removed from the recessed pocket 742 and extended to an intermediate height near a middle of the display 711.

FIG. 7B illustrates a front perspective view of the electronic device 700 with the camera assembly 710 extended to a full telescope length. The camera assembly 710 includes a camera support member 754 with a camera 750 mounted thereon. In the example of FIGS. 7A and 7B, the camera support member 754 includes more than two telescoping arms arranged within one another. For example, the camera support member 754 may include an upper arm 760, an intermediate arm 761 and a base arm 762, all of which are configured to collapse into one another and to extend outward from one another.

Optionally, the camera support member 754 may be constructed to provide multiple discrete levels of extension. For example, when the camera support member 754 is initially tilted upward (e.g. the position illustrated in FIG. 7A), a first extended position may be set to enable the camera to be raised to correspond to a midpoint of the display 711. Accordingly, the camera 750 would be vertically positioned to generally align with the eyes of the user, thereby avoiding an unduly low viewpoint looking upward into the face of the user (e.g. upward onto the chin, nose and face generally). Additionally, a second extended position may be set to enable the camera 750 to be raised and held at a point corresponding to the upper edge of the display 711. Additionally, a third extended position may be set to enable the camera 750 to be raised and held at a position above the upper edge of the display 711 (e.g. the position illustrated in FIG. 7B). When fully extended to the third extended position, the camera 750 may align with the faces of multiple users watching a common display, such as during a videoconference.

In addition, the camera 750 may be swiveled/rotated 360° to direct the field of view in any desired direction. When the camera 750 is extended to a position above the display 711, the field of view is not inhibited by the display 711, regardless of the direction of the field of view. For example, the camera may be swiveled to face forward or rearward relative to the display 711, such as to face a user of the electronic device or to be rotated to have a field of view that corresponds to the same field of view as the user. Optionally, when the camera 750 is positioned at an intermediate level of extension (e.g. such as in FIG. 7A), the camera 750 may be swiveled to face the display 711. For example, it may be desirable during computer support sessions, during videoconferencing sessions and the like, to have the camera 750 face the display 711 and/or keyboard 720.

Figure 8:
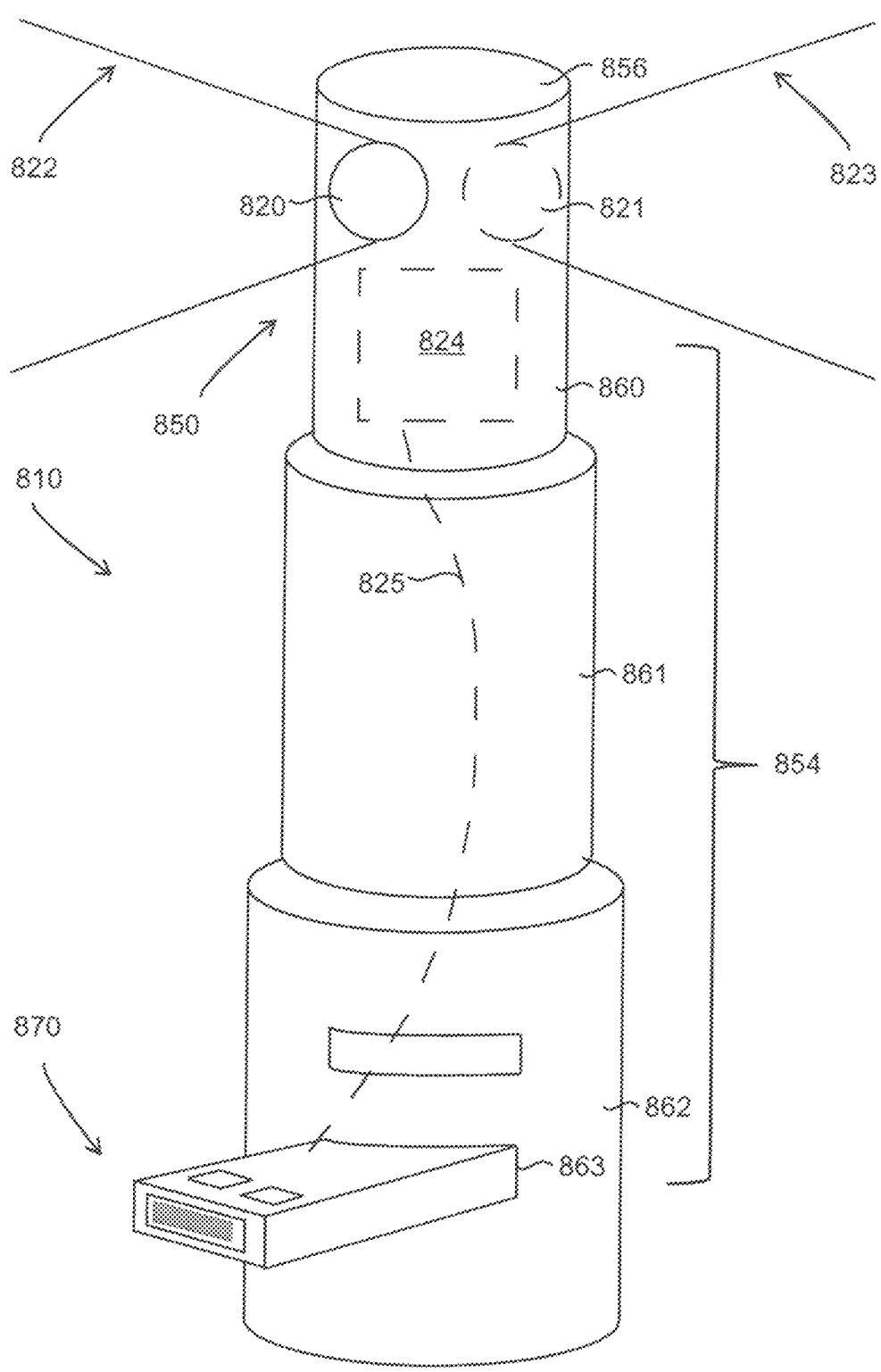
FIG. 8 illustrates a perspective view of a camera assembly formed in accordance with embodiments herein.

FIG. 8 illustrates a perspective view of a camera assembly 810 formed in accordance with embodiments herein. The camera assembly 810 represents a detachable accessory that may be physically and electrically coupled to and decoupled from an electronic device. The camera assembly 810 includes an inner arm 860, an intermediate arm 861 and an outer arm 862 that telescope relative to one another. In the example of FIG. 8, the inner and outer arms 860 and 862 have circular cross-sections. Optionally, various shapes may be utilized for the arms 860-862. An upper/outer end 856 of the arm 860 includes one or more lenses 820, 821 that have corresponding fields of view 822 and 823. Optionally, a single lens 820 may be utilized. The lenses 820, 821 are optically coupled to a digital camera circuit 824 which is housed within the camera support member 854, such as within the inner arm 860. For example, the circuit 824 may represent a charge coupled device (CCD) having an array of pixels sensitive to light. One or both of the lenses 820 and 821 focus images from the fields of view 822, 823 onto the CCD within the circuit 824 to enable the circuit 824 to collect still and video images/frames for the fields of view 822, 823. It is recognized that various types of cameras, lenses and circuits may be utilized in accordance with embodiments herein.

The outer arm 862 includes a communications interface 870 mounted thereon and extending outward therefrom. The communications interface 870 is coupled to the circuit 824 through a communications line 825. By way of example, the communications interface 870 may represent various well-known serial connectors, such as a USB connector, a Lightning connector, a Thunder connector, a DB 9-pin connector, as well as any other well-known connector used with electronic devices. When the communications interface 870 is engaged with a mating port on an electronic device, the camera assembly 810 is physically and electrically coupled to the electronic device, after which the arms 860-862 may be telescoped relative to one another to adjust a height of the camera 850. In addition, the inner arm 860 may be rotated to direct one or both of the lenses 820, 821 in a desired direction.

Optionally, the outer arm 862 may include a coupling device 863, such as a magnet, a mechanical connector, Velcro, tape or other structure. The coupling device 863 securely engages the housing of the electronic device when the camera assembly 810 is attached to the electronic device, in order to afford added structural support during use. In accordance with the foregoing embodiment, the camera assembly 810 is detachably coupled to a corresponding communications port on the electronic device such that the camera assembly 810 is attachable and detachable from the electronic device. Optionally, the camera support member 854 may be constructed as a continuous flexible tube that may be bent in various manners in order to position the camera on the outer end of the flexible tube at any desired height and facing in any desired direction.

Figure 9A:
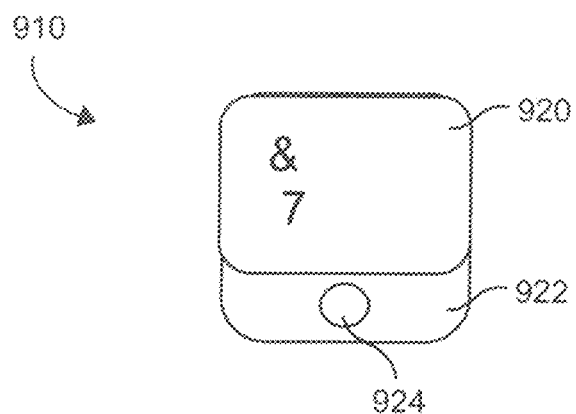
FIG. 9A illustrates a camera assembly formed in accordance with an alternative embodiment.

FIG. 9A illustrates a camera assembly 910 formed in accordance with an alternative embodiment. The camera assembly 910 is built directly into a key 920 on the keyboard. The key 920 includes a front face 922 having a camera lens 924 provided therein. A digital camera circuit is provided either within the body of the key 924 or within the housing of the electronic device generally in the area of the key 920. The key 920 represents a key that is normally located near the upper edge of the keyboard, such as a function key or a numeral key. As one example, it may be desirable to locate the camera assembly 910 within a function key that is not commonly used and/or a numeral key that is relatively far from the main area of the user's fingers. By locating the camera assembly 910 within a key that is generally remote from the user's fingers, a "spidering affect" may be avoided or minimized. The spidering affect occurs when a user's fingers are visible directly in front of a camera while a user is typing. In general, it may be preferable to limit or avoid the spidering affect.

Figure 9B:
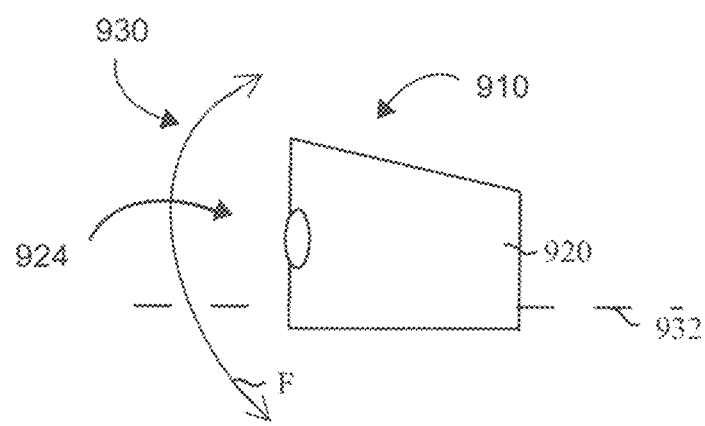
FIG. 9B illustrates a side view of the camera assembly when the key is in the open state and in the closed state in accordance with embodiments herein.
Figure 9B:
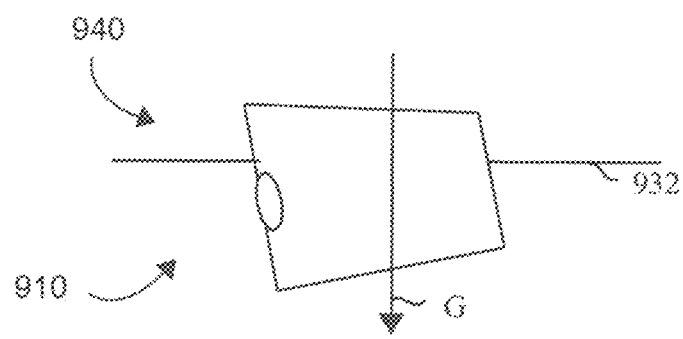

FIG. 9B illustrates a side view of the camera assembly 910 when the key 920 is in the open state 930 and in the closed state 940. When in the open state 930, the key 920 is rocked upward in the direction of arrow F such that the lens 924 is located above the cover 932 surrounding the key 920. When in the closed state 940, the key 920 is rocked downward in the direction of arrow G such that the lens 924 is located below the cover 932. The key 920 may be utilized for its normal function (e.g. as a reference number or function key or otherwise) during normal use of the keyboard. When the user desires to activate the camera, the key 920 is rocked upward to the open state 930 when the user presses downward upon the key 920 with an added force that is greater than the normal force used during typing. Alternatively, the user may hold down on the key 924 an extended period of time that is longer than during normal typing to cause the key 920 to rock upward to the open state 930.

Optionally, the camera assembly 910 may have a Z height that is more than a normal height of a key. Accordingly, the key 920 holding the camera assembly 910 may be made with a slightly greater Z height and fit within a corresponding deeper keyhole.

Figure 10:
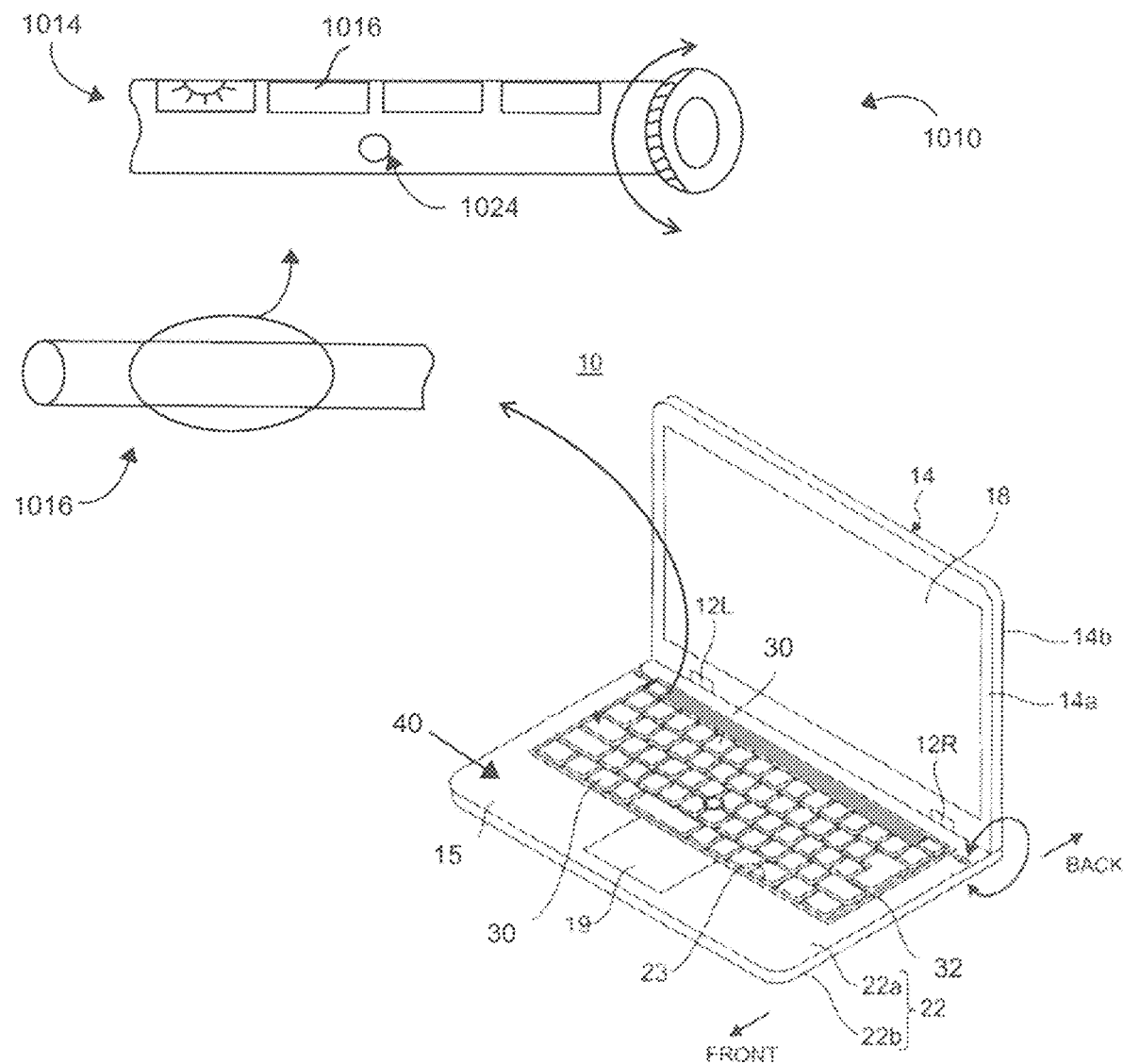
FIG. 10 illustrates a side perspective view of an electronic device that includes a camera assembly formed in accordance with an alternative embodiment.

FIG. 10 illustrates a side perspective view of an electronic device that includes a camera assembly formed in accordance with an alternative embodiment. The example electronic device represents a laptop computer where a barrel assembly 1016 is located in place of at least a portion of one row of keys on the keyboard. The barrel assembly 1014 includes a camera assembly 1010 housed therein. The barrel assembly 1014 includes multiple function keys 1016 provided thereon. The barrel assembly 1016 may be rotated to a first position to expose the function keys 1016, and may be rotated to a second position to expose the camera lens 1024. When the function keys 1016 are exposed, the camera assembly 1010 is in a closed state and is deactivated. When the barrel assembly 1016 is rotated along a longitudinal axis thereof, the camera lens 1024 is oriented to direct upward above the keyboard toward the user. When the camera lens 1024 is directed upward, the camera assembly 1010 is in the open state and is activated. While not illustrated, it is recognized that a digital camera circuit is housed within the barrel assembly 1016 and optically coupled to the lens 1024.

Figure 11:
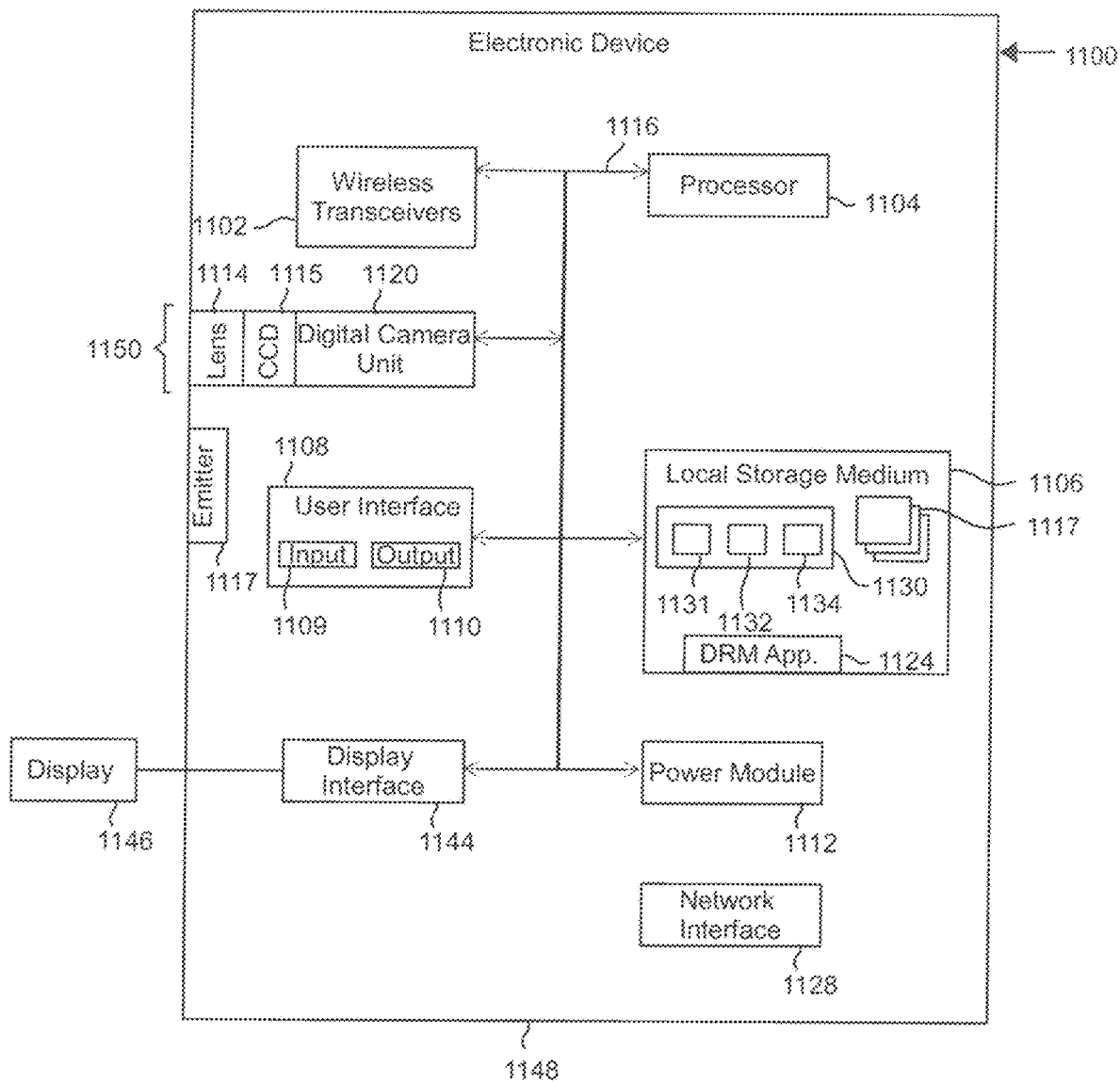
FIG. 11 illustrates a block diagram of an electronic device in accordance with embodiments herein.

FIG. 11 illustrates a block diagram of an electronic device 1100 (e.g. a laptop computer, tablet devices, smart phone and the like) which includes components such as one or more wireless transceivers 1102, one or more processors 1104 (e.g., a microprocessor, microcomputer, application-specific integrated circuit, etc.), one or more local storage medium (also referred to as a memory portion) 1106, a display 1146, a user interface 1108 which includes one or more input devices 1109 and one or more output devices 1110, a power module 1112, a camera assembly 1120, a display interface 1144 and a network interface 1128. The components can be operatively coupled to one another, and can be in communication with one another, by way of one or more internal communication links 1116, such as an internal bus.

The processor 1104 performs the disclosed methods by executing the sequences of operational instructions that comprise each computer program resident in, or operative on, the memory 1106. The memory 1106 may include operating system, administrative, and database programs that support the programs disclosed in this application.

The housing 1148 of the electronic device 1100 holds the processor(s) 1104, local storage medium 1106, user interface 1108, the camera assembly 1150 and other components. The camera assembly 1150 collects data in connection with one or more viewer characteristics of interest (COI). The camera assembly 1150 may represent a still or video camera that collects still or video image frames. A lens 1114 is optically and communicatively coupled to the camera assembly 1150. The lens 1114 may be mounted at various locations on the housing 1112. Optionally, multiple lenses 1114 may be positioned at various distributed positions within, or about the perimeter of the housing 1112. The camera assembly 1150 may represent various types of still or video cameras, detection units and the like. The camera assembly 1150 may further include a lens 1114 and one or more detectors 1115, such as a charge coupled device (CCD). The detector 1115 may be coupled to a local processor (e.g., digital camera unit 1120) within the camera assembly 1150 that analyzes image frame data captured. The camera assembly 1150 may include one or multiple combinations of detectors and lens. For example, an array of two or more detector/lens combinations may be spaced apart from one another (as illustrated in FIG. 8). When multiple detectors/lens are used, each detector/lens combination may be oriented in at least partially different directions, such that the fields of view of the respective detector/lens combinations encompass different areas.

Additionally or alternatively, the camera assembly 1150 may collect data related to a field of view other than image frames. For example, the camera assembly 1150 may represent one or more infrared (IR) light emitting diode (LED) based—camera devices. For example, one or more IR-LED emitters 1117 may be used to illuminate the field of view with one or more select wavelengths of light (e.g., 880 nm). A high pass filter (HPF) element may be located with the lens 1114 such that the HPF element passes infrared light with a select wavelength (e.g., 800 nm). The IR-LED emitter 1117 and detector 1115 represent one type of camera that collects data related to a field of view.

It is recognized that the camera assembly 1150 may be housed within any of the various camera support members described and illustrated herein, including an entirely detachable camera support member as illustrated in FIG. 8. The camera assembly 1150 may also be housed within one or more keys on the keyboard (as illustrated in FIGS. 9A and 9B. Optionally, the emitter 1117 may be provided in the same or one or more different keys on the keyboard. The camera assembly 1150 may also be housed within the barrel assembly 1014 (FIG. 10).

The input and output devices 1109, 1110 may each include a variety of visual, audio, and/or mechanical devices. For example, the input devices 1109 can include a visual input device such as an optical sensor or camera, an audio input device such as a microphone, and a mechanical input device such as a keyboard, keypad, selection hard and/or soft buttons, switch, touchpad, touch screen, icons on a touch screen, a touch sensitive areas on a touch sensitive screen and/or any combination thereof. Similarly, the output devices 1110 can include a visual output device such as a liquid crystal display screen, one or more light emitting diode indicators, an audio output device such as a speaker, alarm and/or buzzer, and a mechanical output device such as a vibrating mechanism. The display may be touch sensitive to various types of touch and gestures. As further examples, the output device(s) 1110 may include a touch sensitive screen, a non-touch sensitive screen, a text-only display, a smart phone display, an audio output (e.g., a speaker or headphone jack), and/or any combination thereof. The user interface 1108 permits the user to select one or more of a switch, button or icon in connection with normal operation of the electronic device 1100.

The local storage medium 1106 may encompass one or more memory devices of any of a variety of forms (e.g., read only memory, random access memory, static random access memory, dynamic random access memory, etc.) and can be used by the processor 1104 to store and retrieve data. The data that is stored by the local storage medium 1106 can include, but need not be limited to, operating systems, applications, streaming video content, resolution maps, viewer COIs, display attributes and informational data. Each operating system includes executable code that controls basic functions of the communication device, such as interaction among the various components, communication with external devices via the wireless transceivers 1102, the network interface 1128 and/or the display component interface 1114, and storage and retrieval of applications and data to and from the local storage medium 1106. Each application includes executable code that utilizes an operating system to provide more specific functionality for the communication devices, such as file system service and handling of protected and unprotected data stored in the local storage medium 1106.

The local storage medium 1106 stores various content, including but not limited to video content 1117, one or more still images, viewer characteristics of interest 1130 such as viewing distance 1131, position data 1132, line of sight (LOS) data 1134, lighting level, and the like. The video content 1117 may represent various types of graphical and video content including audio content.

Other applications stored in the local storage medium 1106 include various application program interfaces (APIs). Additionally, the applications stored in the local storage medium 1106 include a viewing perspective management (VPM) application 1124 representing program instructions that direct one or more processors to reduce or eliminate undesirable image perspectives, such as when the camera assembly is located below or above the user's line of sight. For example, the VPM application 1124 may manipulate images collected by the camera assembly 1150 to reduce the "spidering affect", to reduce the bottom-up perspective, as well as other undesirable imaging perspectives. For example, when the lens is located below the line of sight, the images may, if left uncorrected, present a bottom-up view of a user's chin and nose. The VPM application 1124 may perform image processing upon the images as collected to shift the perspective of the view upward such that the users chin and nose are not as noticeable. The VPM application 1124 includes program instructions accessible by the processor 1104 to direct the processor 1104 to implement the methods, processes and operations described herein.

In accordance with embodiments herein, the VPM application 1124 may identify facial features, eye movement, line of sight of the eyes and the like. In accordance with embodiments herein, the camera assembly 1150 collects a series of image data frames 1130 associated with the scene over a select period of time. For example, the camera assembly 1150 may begin to capture the image data frames 1130 when the application 1124 senses movement of the room. Image frame data 1130 may be collected for a predetermined period of time, for a select number of frames or based on other data collection criteria. For example, the camera assembly 1150 may include capturing image frame data which may represent a viewer's face with the camera, detecting eye movement from the image frame data and calculating, utilizing the processor, the gaze direction vectors from the eye movement to determine whether the viewer is gazing at the display.

The processor 1104, under control of the application 1124, analyzes one or more image data frames 1130, to perform various desired operations such as to detect a position of one or more viewers, viewer's faces, eye movement, gaze, direction, etc. Optionally, the processor 1104, under the control of the application 1124, may determine the line of sight associated with one or more viewers, such as to identify who is watching a television. The LOS data 1134 may represent a gaze direction vector defined with respect to a coordinate system. For example, the gaze direction vector may be defined with respect to a polar coordinate system, where a reference point and origin of the polar coordinate system are located at a known position.

The power module 1112 preferably includes a power supply, such as a battery, for providing power to the other components while enabling the electronic device 1100 to be portable, as well as circuitry providing for the battery to be recharged. The component interface 1114 provides a direct connection to other devices, auxiliary components, or accessories for additional or enhanced functionality, and in particular, can include a USB port for linking to a user device with a USB cable.

Each transceiver 1102 can utilize a known wireless technology for communication and receiving wireless streaming video content. Exemplary operation of the wireless transceivers 1102 in conjunction with other components of the electronic device 1100 may take a variety of forms and may include, for example, operation in which, upon reception of wireless signals, the components of electronic device 1100 detect communication signals and the transceiver demodulates the communication signals to recover incoming information, such as video content, transmitted by the wireless signals.

It should be clearly understood that the various arrangements and processes broadly described and illustrated with respect to the Figures, and/or one or more individual components or elements of such arrangements and/or one or more process operations associated of such processes, can be employed independently from or together with one or more other components, elements and/or process operations described and illustrated herein. Accordingly, while various arrangements and processes are broadly contemplated, described and illustrated herein, it should be understood that they are provided merely in illustrative and non-restrictive fashion, and furthermore can be regarded as but mere examples of possible working environments in which one or more arrangements or processes may function or operate.

Aspects are described herein with reference to the figures, which illustrate example methods, devices and program products according to various example embodiments. These program instructions may be provided to a processor of a general purpose computer, special purpose computer, or other programmable data processing device or information handling device to produce a machine, such that the instructions, which execute via a processor of the device implement the functions/acts specified. The program instructions may also be stored in a device readable medium that can direct a device to function in a particular manner, such that the instructions stored in the device readable medium produce an article of manufacture including instructions which implement the function/act specified. The program instructions may also be loaded onto a device to cause a series of operational steps to be performed on the device to produce a device implemented process such that the instructions which execute on the device provide processes for implementing the functions/acts specified.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. An electronic device, comprising:
    a housing having an upper face that includes a cover having an opening disposed therein;
    a processor and memory provided within the housing;
    a keyboard which includes a bezel and multiple keys, the keys disposed in and extending through a plurality of holes disposed in the bezel, the bezel positioned within the opening disposed in the cover;
    a display; and
    a camera assembly at least partially housed within a body that is rotatably mounted within the cover of the keyboard and located within the bezel of the keyboard, the camera assembly including a lens provided in a face of the body, the body moving between opened and closed states, relative to the cover, to expose and cover the lens, respectively.

2. The electronic device of claim 1, wherein the body represents a first key on the keyboard, the camera assembly at least partially housed within the first key, in the opened state, the first key rocked upward in a direction such that the lens is located above the cover surrounding the first key, in the closed state, the first key rocked downward in an opposite direction such that the lens is located below the cover.

3. The electronic device of claim 2, wherein, in the closed state, the first key operates based on an assigned function during normal use of the keyboard, and in the opened state, the camera assembly is activated.

4. The electronic device of claim 2, wherein, the camera assembly is activated and the first key is rocked from the closed state to the open state in response to a downward added force upon the first key that is greater than a normal typing force.

5. The electronic device of claim 2, wherein, the first key has a height that is greater than a height of a remainder of the multiple keys.

6. The electronic device of claim 2, wherein the camera assembly includes a digital camera circuit provided within the body of the first key.

7. The electronic device of claim 2, wherein the first key is located near an upper edge of the keyboard.

8. The electronic device of claim 2, wherein the first key represents a function key or a numeral key.

9. The electronic device of claim 8, wherein the function key or numeral key is located remote from a main user finger area on the keyboard.

10. The electronic device of claim 1, wherein the body is shaped as a barrel assembly and is located along at least a portion of a row of keys on the keyboard, the barrel assembly including the camera assembly, the barrel assembly including at least one key thereon that is exposed when the barrel assembly is rotated to a first position, the camera assembly being positioned in the opened state when the barrel assembly is rotated to a second position.

11. The electronic device of claim 10, wherein the barrel assembly includes multiple function keys provided thereon, the barrel assembly rotatable to the first position to expose the function keys.

12. The electronic device of claim 10, wherein the camera assembly is deactivated when the at least one key is exposed.

13. The electronic device of claim 10, wherein the barrel assembly is rotated along a longitudinal axis thereof and the lens faces in a radial direction outward from the longitudinal axis, the lens to be oriented upward above the keyboard, when the camera assembly is in the open state and is activated.

14. The electronic device of claim 1, wherein a portion of the multiple keys extend along an upper edge of the keyboard and within the periphery of the keyboard, and wherein the body is located in line with the portion of the multiple keys along the upper edge of the keyboard.

15. The electronic device of claim 1, wherein the bezel is vertically movably disposed in the opening in the cover of the upper face of the housing.

16. A method comprising:
    providing an electronic device that comprises:
        a housing having an upper face that includes a cover having an opening disposed therein;
        a processor and memory provided within the housing;
        a keyboard which includes a bezel and multiple keys, the keys disposed in and extending through a plurality of holes disposed in the bezel, the bezel positioned within the opening disposed in the cover; and a display;
    providing a camera assembly at least partially housed within a body, the camera assembly including a lens provided in a face of the body; and
    rotatably mounting the body within the cover of the keyboard and within the bezel of the keyboard, the body movable between opened and closed states, relative to the cover, to expose and cover the lens, respectively.

17. The method of claim 16, further comprising at least partially housed the camera assembly within the body of a first key on the keyboard, and wherein, in the opened state, the first key rocked upward in a direction such that the lens is located above the cover surrounding the first key, and wherein, when in the closed state, the first key rocked downward in an opposite direction such that the lens is located below the cover.

18. The method of claim 16, further comprising activating the camera assembly when the first key is rocked from the closed state to the opened state in response to a downward added force upon the first key that is greater than a normal typing force.

19. An electronic device, comprising:
    a housing having an upper face that includes a cover;
    a processor and memory provided within the housing;

a keyboard which includes a bezel and a first key, the first key disposed in and extending through a first hole disposed in the bezel, the bezel positioned within the opening disposed in the cover;

a display; and a camera assembly at least partially housed within the first key, the first key rotatably mounted within the cover of the keyboard, the camera assembly including a lens provided in a face of the first key, the first key moving between opened and closed states, relative to the cover, to expose and cover the lens, respectively;

wherein, in the opened state, the first key rocked upward in a direction such that the lens is located above the cover surrounding the first key;

wherein, in the closed state, the first key rocked downward in an opposite direction such that the lens is located below the cover.

20. The electronic device of claim 19, wherein, in the closed state, the first key operates based on an assigned function during normal use of the keyboard, and in the opened state, the camera assembly is activated.

21. The electronic device of claim 19, wherein, the camera assembly is activated and the first key is rocked from the closed state to the open state.

22. The electronic device of claim 19, wherein the first key is located near an upper edge of the keyboard.

* * * * *